March 30, 1965 G. T. RANDOL 3,175,235
REACTION-TRANSMITTING MECHANISM ADAPTED FOR
PRESSURE DIFFERENTIAL MOTOR USE
Original Filed Sept. 2, 1958 4 Sheets-Sheet 2
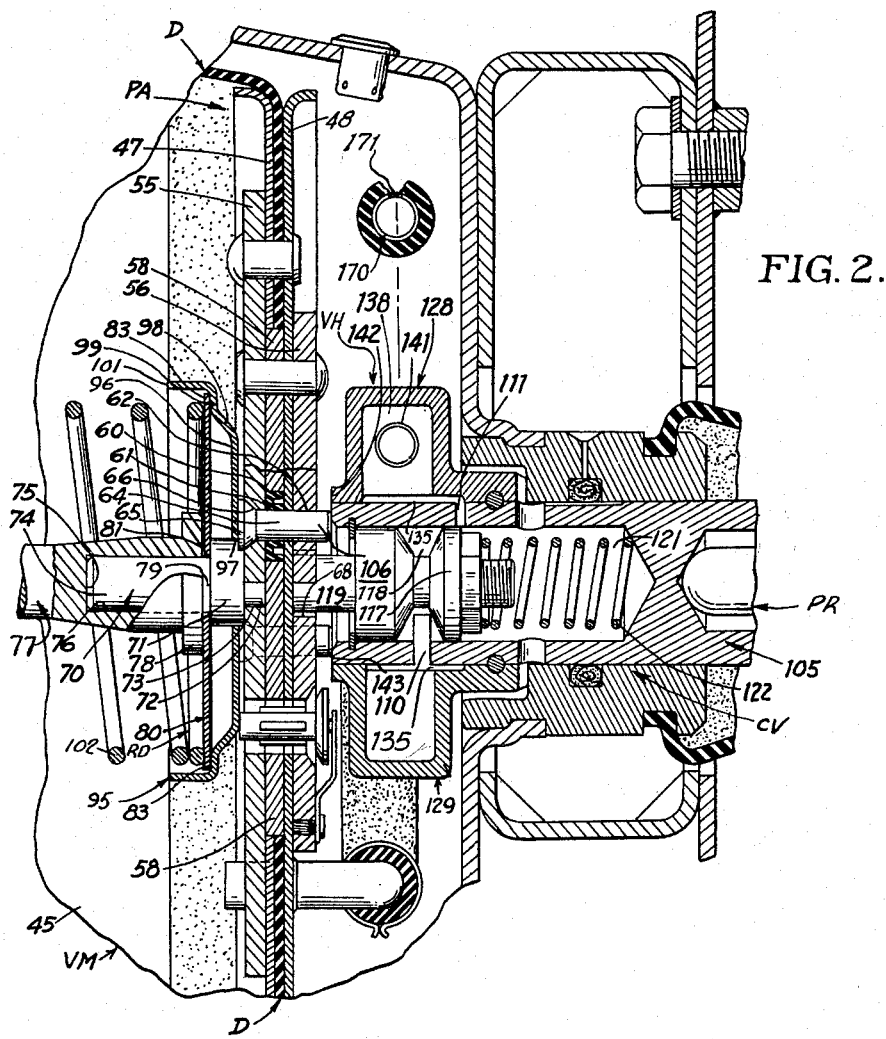
FIG. 2.
Inventor

*Inventor*

March 30, 1965
G. T. RANDOL
3,175,235
REACTION-TRANSMITTING MECHANISM ADAPTED FOR
PRESSURE DIFFERENTIAL MOTOR USE
Original Filed Sept. 2, 1958
4 Sheets-Sheet 4

*Inventor* ated Mar. 30, 1965

3,175,235
REACTION-TRANSMITTING MECHANISM ADAPTED FOR PRESSURE DIFFERENTIAL MOTOR USE
Glenn T. Randol, 3 E. 2nd Ave., Loch Lynn, P.O. Box 275, Mountain Lake Park, Md.
Original application Sept. 2, 1958, Ser. No. 758,405. Divided and this application Dec. 8, 1961, Ser. No. 159,200
20 Claims. (Cl. 91—369)

This application is a division of my copending application Serial No. 758,405, filed September 2, 1958, abandoned in favor of continuing application Serial No. 122,037, filed July 5, 1961, now issued to Patent No. 3,072,106, dated January 8, 1963.

The invention relates to novel reaction-transmitting mechanism disclosed in said earlier filed application and illustrated by way of example, in operative association with a novel booster type brake-servo (motor) having a power member operated by pressure differential, wherein said mechanism is operatively incorporated between said power member and the work output element movable in part thereby, portions of said mechanism being responsive to initial operator-actuation subjecting said work element to a predetermined resistance to movement for conditioning said mechanism to transmit a portion of the reaction from said work element to the operator resulting from operative energization of said power member reaching sufficient magnitude in cooperation with operator-actuation control thereof to overcome said predetermined resistance to additionally move said work element.

Workers in the art have heretofore proposed various pressure sensing devices adapted for transmitting to the operator an awareness of the energized status of different types of booster motors employed to assist in operating the conventional hydraulic brake system on automotive vehicles and the like. Some of these devices utilize a pressure-responsive diaphragm having an area proportionally less than that of the motor power member, to react on the brake-pedal, others have resorted to mechanical lever systems which become effective to transmit reaction following initial energization of the booster motor, and to the compressive status of a resilient block interposed in the thrust path between the work element and operator-operated part of the control valve for such motors, to impart to the operator a sensing of the division of work in effect between the operator and such motors, but none has produced a mechanical reaction-transmitting mechanism comprising a plurality of levers which requires operator-actuation from normal non-transmitting disposition prior to energization of the associated booster motor, to render said mechanism effective to transmit reaction from the work element (load) upon the booster motor becoming operatively energized under supervision of the operator as a function of the work element being subjected to a predetermined load (resistance) under initial operator-actuation, thus providing the operator with physical awareness through the brake-pedal of the pressure being applied on the brake fluid. This novel reaction mechanism is adaptable to a wide range of commercial applications in conjunction with different types of booster motors and the like. Therefore, there are certain features of construction and operation which relate particularly to the reactive mechanism per se, thus rendering the same applicable for controlling reaction transferral from the work performing element of booster motors of the type illustrated in operative association with systems and/or devices other than vehicular brake systems. These features of the reactive mechanism per se form the subject-matter of the present application.

The primary object of the invention is directed to a more detailed consideration of the reaction mechanism which comprises a plurality of radially arranged levers acted on at their opposite ends by the motor power member, and the operator member respectively, and peripheral portions on a fulcrum block movable as a unit with the work element being adapted to engage intermediate portions of the said levers on the side opposite that acted on by said power and operator members, to produce a lever system adapted to transmit reaction from the work element proportionally according to the division of work between the power and operator members as defined by the leverage ratio.

A more specific object of the invention seeks to provide in such a lever reaction system an ineffective position substantially normal to the axis of the booster power member and coaxial work element, and wherein said member and element are engaged, and an effective position for transmitting reaction from the work element, induced by movement of the outer ends of said levers under initial operator-actuation to tilt said levers out of their ineffective position to effective position and thereby disengage the work element from the said power member to enable the fulcrum block on the work element to react on the intermediate portions of said levers upon operative energization of the booster motor, said reaction on said levers being divided proportionally between the power member and operator in accordance with the leverage ratio.

An object related to the object next preceding is to produce simplified means for varying the division of work between the operator (driver) and booster unit, by varying the height of the fulcrum block, and to that end said block may be separate from the work element rather than integrated therewith.

Another object of my invention related to the two objects next above is to utilize in such a reaction system, levers characterized by resiliency or rigidity (nonflexible), the former type of levers transmitting to the operator a progressively increasing reactive force, while the latter type would transmit such reactive forces proportionally to the operator.

With these and other objects and advantages in view, the invention consists of the new and novel combinations, construction, and arrangement of parts as hereinafter more fully described, set forth in the claims appended hereto, and disclosed in the accompanying drawings forming a part hereof, wherein:

FIGURE 2 is a fragmentary sectional view taken from FIGURE 1 on an enlarged scale to clarify the details;

Figure 1:
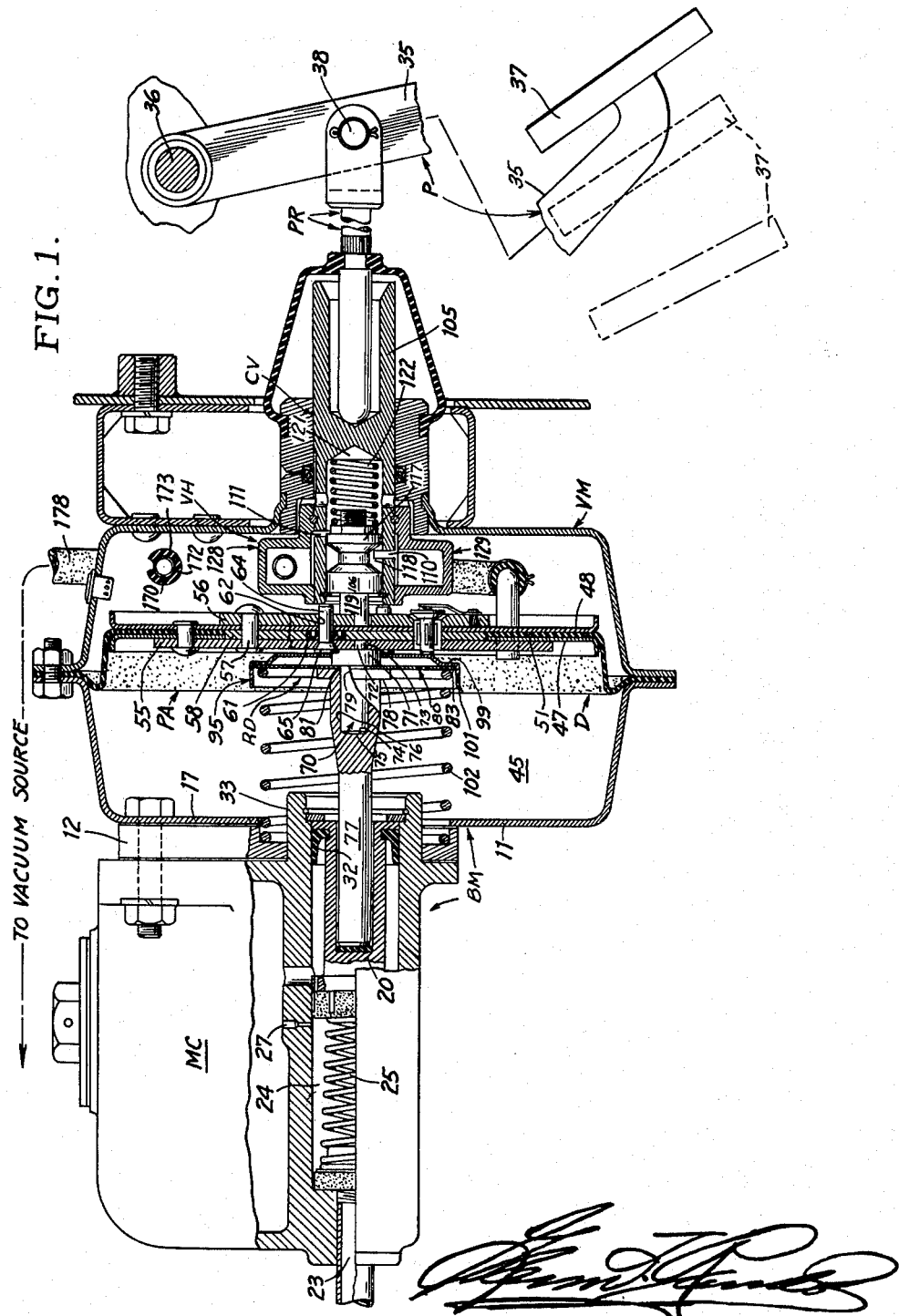
FIGURE 1 illustrates a pressure differential operated booster motor in which my novel reactive mechanism is incorporated in accordance with the principles of the present invention, the parts being shown in normal ineffective position to transmit reaction from the work element of said motor.

Referring now to the drawings, and particularly to FIGURES 1, 2, 3 and 4 my novel reactive device or mechanism is generally designated "RD" and is illustrated, by way of example, in operative association with a pressure differential operated booster motor or vacuum-power cylinder generally designated "VM" of a booster brake mechanism "BM" to operate the conventional master cylinder "MC" for hydraulic brake systems employed on automobiles and the like as shown in FIGURE 1. The master cylinder is mounted on the motor end wall 11 by means of an adapter plate 12, and includes a fluid-displacing unit reciprocable in the master cylinder bore, such as the spool-type piston illustrated at 20 which is opposed by a normally preloaded return spring 25, the forward end of the spring reacting on the conventional residual pressure valve "RV" for controlling fluid flow through the discharge port 23 and for establishing a minimal residual pressure in the brake system external to the master cylinder as is understood. A suspended-type pedal assembly generally designated "P" has a pedal member (arm) 35 pivotally suspended from its upper end on a portion of the vehicle at 36, and the lower end of said arm terminates in a foot-pad 37 whereby operator force may be exerted thereagainst to operate the pedal mechanism. A push-rod "PR" is pivotally connected at one end to an intermediate point 38 on the pedal arm to control one of the elements 105, 106 comprising the control valve "CV" which in assembled status includes a two-sectioned housing "VH" and a normally preloaded spring 122 for biasing said elements toward normal relative positions. The pedal-controlled valve element is adapted to control an auxiliary air valve "AV" in synchronism with the restrictive air control provided by the main control valve CV for rapid release of the vehicle brakes. The movable power assembly "PA" comprising circular plates 55, 47, 58, 48 and 56 of the vacuum-motor VM carries a plurality of intermediately disposed holes 60 radially offset from the axis thereof in circumferentially equally spaced relation, each of said holes being fitted with an annular double-lip pliant seal 61, and interconnecting said holes with opposite sides of said power assembly is a corresponding number of holes 62 of smaller diameter than holes 60 in coaxial disposition therewith, and through which actuatable pins 64 slidably project via said seals. The pins are provided with tapered heads 65 which normally engage complemental countersinks 66 which terminate the outer end of one of each pair of holes 62 as shown.

The reactive device RD comprises: a force-transmitting pilot member or stem generally designated 70 having a medially disposed external annular flange or shoulder 71 fixed coaxially adjacent the forward side of a thrust plate 55 as by welding the right end extension 72 of the stem in a centrally disposed hole 73, the terminus of the other end extension 74 of the stem normally engages the closed end 75 of an axial blind bore 76 of predetermined depth extending from the inner end of a work-performing element disclosed herein as a plunger 77, with the opposite end of said plunger operably projecting through circular openings in the end wall 11 of the motor VM and mounting plate 12 for reception of the master cylinder hub defining the open end of the aforesaid master cylinder bore, to actuate the master cylinder piston 20 opposed by spring 25 best demonstrated in FIGURE 1. The exterior of the inner end of the plunger 77 is provided with a flush circular flange or shoulder 78 to serve as a fulcrum block of larger diameter than shoulder 71, said shoulders 71, 78 being coaxially disposed and normally spaced predeterminately to provide an annular variable space 79 therebetween when the stem extension abuts the closed end 76 best demonstrated in FIGURE 2. Accordingly, the aforesaid piloted connection between the plunger and stem accommodates relative separation of these parts to widen the space normally obtaining between said shoulders for an important purpose to appear.

Figure 4:
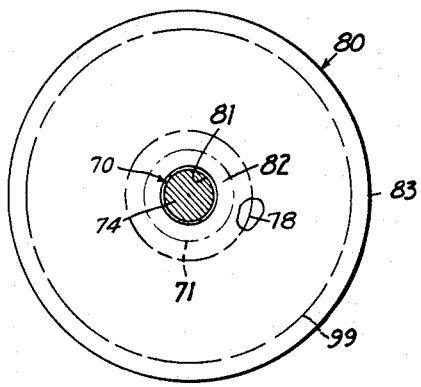
FIGURE 4 is a view of the reaction disc per se.

A normally relaxed resilient diaphragm or disc 80, preferably of circular configuration is provided with a central aperture 81 through which the stem flange 71 projects to slidably support the disc in coaxial disposition with respect to the plunger flange 78, the marginal portion 82 adjacent the perimeter of said aperture being loosely disposed between the shoulders 71, 78 since the thickness (gauge) of the disc is, for example, .005 to .007 in. less than the normal width of the space between said shoulders to prevent fracture of the disc as a consequence of the hammer-action between said shoulders were the marginal portion impinged therebetween under tension. The circular marginal portion adjacent the peripheral edge 83 of the disc on the same side as the stem shoulder 71, is acted on by the pedal 35 via means to be fully described later to "cup" (deform) the disc forwardly to change it from a substantially flat plane to a concavity simulating the configuration of the well known "Belleville" spring washer in consequence of the lever-action between the shoulders 71, 78 with the latter shoulder acting as the fulcrum point which may be varied according to the division of work desired between the operator of the vehicle and the booster unit shown generally at "BM" in FIGURE 1, by changing the height of said shoulder 78. As shown in FIGURE 4, the preferred construction of the disc 80 includes a plurality of inwardly projecting radial fingers or levers 85 joined at their outer ends by a circular web 86 to facilitate "cupping" of the disc and thereby tensioning the same to condition the disc to transmit reaction from the work element 77 when the latter encounters resistance to movement.

The aforesaid lever-action in the disc 80 which becomes effective upon the work element being subjected to a predetermined resistance (work load) solely under operator-actuation, tends to force the power assembly PA rearwardly slightly and to apply pressure on the plunger 77 in a fluid pressurizing direction thus effecting slight relative separation of these two components (see FIGURE 3) with the marginal portion 82 encircling said aperture 81 offset with respect to the shoulders 71, 78. Accordingly, dishing of the disc as aforesaid induced by said lever-action sets up a progressively increasing tension in said disc in accordance with the distance the peripheral edge 83 is deflected out of plane with respect to the inner marginal portion 82 to thereby serve an initial role of conditioning the master cylinder MC for operation prior to the power phase becoming effective, and to provide reaction from the master cylinder on the operator-operated member (pedal) 35 in accordance with the leverage ratio and tension characterizing the disc for a given diameter, thickness and/or perforation pattern said disc. This reaction is produced jointly by operator force exerted on the pedal assembly P and the vacuum-motor power assembly PA when operatively energized after the disc 80 has been tensioned as aforesaid, and is transmitted from the shoulder 71 acting on the peripheral edge of the aperture 81, fulcrum 78 thence through the disc body to the operator member via the actuating pins 64 carried by the power assembly PA as will appear. As the power diaphragm PA increases its output on the edge of the aperture, the abnormally separated condition aforesaid of the shoulders 71, 78 is progressively dissipated until the normal space therebetween is restored wherein the stem extension 74 abuts the end wall 75 of the plunger 77 to provide a "straight-through" thrust on the plunger 77 from the power diaphragm as is understood, while the peripheral portion of the disc 80 is held forwardly under tension by the pedal 35. At the point where the power output is sufficient to restore the shoulders 71, 78 to their normally spaced relation shown in FIGURE 2, whether or not this point defines power-run-out, reaction through the disc becomes substantially constant in consequence of the loss of the lever-action between the power-actuated shoulder 71 and the fulcrum shoulder 78 on the plunger 77 since the plunger has reached the status of being substantially stationary due to the non-compressible nature of the column of brake fluid as is understood, such loss of lever-action being due to contiguous parallelism of the face portions of said shoulders and interposed inner ends of the levers comprising the disc 80. But, as long as the working force of the vacuum-motor VM is sufficient to effect the braking pressure desired without eliminating the abnormally separated condition of the shoulder 71, 78 reaction from the master cylinder MC via the plunger 77 increases progressively, but not proportionally, as the motor output increases due to the lever-action on and the resilient nature of the disc 80 which may also be termed a "spring-lever" since the disc combines lever and spring characteristics for transmission of reaction.

Figure 5:
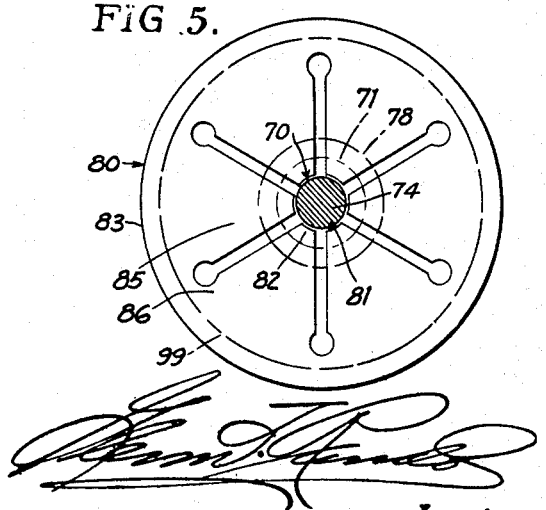
FIGURE 5 is a view of a modified reaction disc per se.

Varying degrees of resiliency in the disc 80 may be obtained in accordance with the springy characteristic thereof and by varying the shape, diameter, thickness or cut-outs therein depicted exemplarily in FIGURE 5. As demonstrated in this view, the disc may be fabricated with a plurality of inwardly projecting radial fingers (levers) 85 joined at their outer ends by a circular web 86, with the inner ends of the fingers straddle mounting on the stem extension 74 and extending on opposite sides thereof to the axis of said extension for shoulder 71 to act thereon.

Accordingly, a wide range of reaction discs may be produced by incorporating the illustrated configuration of cutout patterns or modifications thereof in the solid disc shown in FIGURE 4, said cutouts serving to reduce resistance to "dishing" of the disc. In this manner, the present booster brake motors may be provided with selective spring-pressure reaction to produce the desired pedal "feel" according to the type vehicle and/or pedal system employed, that is, a moderately "low-pedal" or a normal height pedal which vary in their mechanical advantage according to the distance provided for pedal movement in relation to the full operating stroke of the master cylinder MC.

Slidably mounted on the annular flange 71 of the pilot stem 70 is a circular cup-shaped member or spring seat generally designated 95. This spring seat is normally juxtaposed with respect to the forward side of the power assembly PA in engagement with the flared heads 65 of the previously mentioned actuating pins 64 slidably projecting through holes 62 in said assembly in sealed relation by said double-lip seals 61, said pins serving to provide in part the operative connections between the spring seat and the pedal 35 as shown in FIGURE 1 whereby pedal movement is transmitted via said pins to the spring seat to move as a unit therewith. Rear ends of said pins are acted on by portions of the circular end face 143 of the control valve. The spring seat comprises: a vertical bottom wall 96 constantly engaged by the pin heads 65 and centrally apertured at 97 through which the annular flange 71 projects to slidably support the spring seat in operating position, a peripheral offset at 98 in the wall 96 provides an inner annular shoulder 99 against which the marginal portion adjacent the peripheral edge 83 of the resilient disc bears, said member 95 terminating forwardly in a circular horizontal wall or flange 101. A normally preloaded compression spring 102 encircles a portion of the plunger 77 with one end bearing on the marginal shoulder provided by a counterbore which terminates the inner end of the opening through the adapter plate 12, such positioning of the end of said spring being accommodated by the coaxial openings in the gaskets and end wall 11 of the vacuum-motor VM respectively being the same diameter as the counterbore as shown in FIGURE 2. The outer end of spring 102 reacts on the opposite side of the peripheral portion aforesaid of the resilient disc 80 to maintain the periphery of the disc in engagement with the offset 98 and to urge the spring seat 95 to act through the seated pins 64 on the power assembly PA to move the latter as a unit with the spring seat toward their respective normal positions shown in FIGURES 1 and 2. The reaction produced in this spring is in sharp contrast to that produced by the reaction disc 80, in that, spring 102 offers increasing resistance to the pedal assembly P in relation to the distance it is moved from its normal position shown in FIGURE 1 and therefore, the reaction transmitted thereby to the pedal assembly is not related to pressure produced by the power assembly PA on the plunger 77. In fact, the reaction from spring 102 is somewhat transitory serving to provide increasing resistance to pedal movement up to the point of the master cylinder MC becoming conditioned to pressurize the fluid therein to effect a braking application under joint influence of the operatively energized vacuum-motor VM and operator-actuation of the pedal assembly P, and thereafter, reaction from the master cylinder becomes substantially constant due to the virtually stationary condition of the parts utilized to pressurize the brake fluid brought about by the non-compressible column of fluid as is understood.

Initial pressurization of the brake fluid by the piston 20 combined with the reaction from piston return spring 25 solely under operator-actuation of the pedal assembly P, produces a predetermined resistance to movement of the work element 77 of sufficient magnitude to induce relative displacement of the control valve elements 105, 106 therefore unitary movement of the element 105, spring seat 95 and outer periphery of the reaction disc 80 to "cup" the latter, relative to valve element 106 and power member PA with resultant abnormal separation of the shoulders 71, 78 which operation conditions the reaction disc to transmit reaction from the work element to the pedal assembly P upon operative energization of the vacuum-motor VM under pedal control. It is thus seen that the present reactive device RD cannot be made operative to transmit reaction from the work element 77 unless a predetermined resistance reacts thereagainst of sufficient magnitude to enable operator-actuation through the pedal assembly P to overcome the valve spring 122, the yielding of this spring enables the valve elements 105, 106 to move relatively to control operative energization of the vacuum-motor VM, however, such energization is so coordinated with the "cupping" of the disc 80, that the motor cannot become energized until the slack-take-up operation of the vehicle brakes has been completed in response to the aforesaid initial pressurization of the brake fluid for smooth application of the brakes under all operating conditions of the pedal assembly P.

Accordingly, spring 102 serves the novel purpose of supplementing the resilient disc 80 during conditioning of the master cylinder MC to pressurize the brake fluid sufficiently to initially apply the brakes prior to operative energization of the vacuum-motor VM, but during the power-braking stage, the resilient disc 80 continues to transmit a progressively increasing force on the pedal assembly P during the power-assisting operation up to the point where the vacuum-motor effects a "straight-through" operation to the master cylinder MC which point approximates introduction of assistance from the operator due to power-run-out as will be more fully explained in the course of the description to follow.

Operation

The operation of my novel and improved reaction mechanism RD will be apparent from the foregoing description but may be summarized as follows:

Assuming the booster mechanism BM is installed on a motor vehicle as the present disclosure exemplarily demonstrates in FIGURE 1, to operate the hydraulic brake system (not shown) commonly employed on such vehicles, is in released brake "off" condition as depicted in FIGURES 1 and 2. With the engine running, sub-atmospheric pressure (vacuum) is produced within the inlet-manifold (not shown) which is conveyed through conduit 178, tube 170, conduit 173, tube 141 in valve segment 129, cavity 135 and vacuum-slot 110 to evacuate the air from annular space 118 on the valve piston 106 which conditions the main control valve CV for operation to control operative energization of the vacuum-motor VM.

Figure 3:
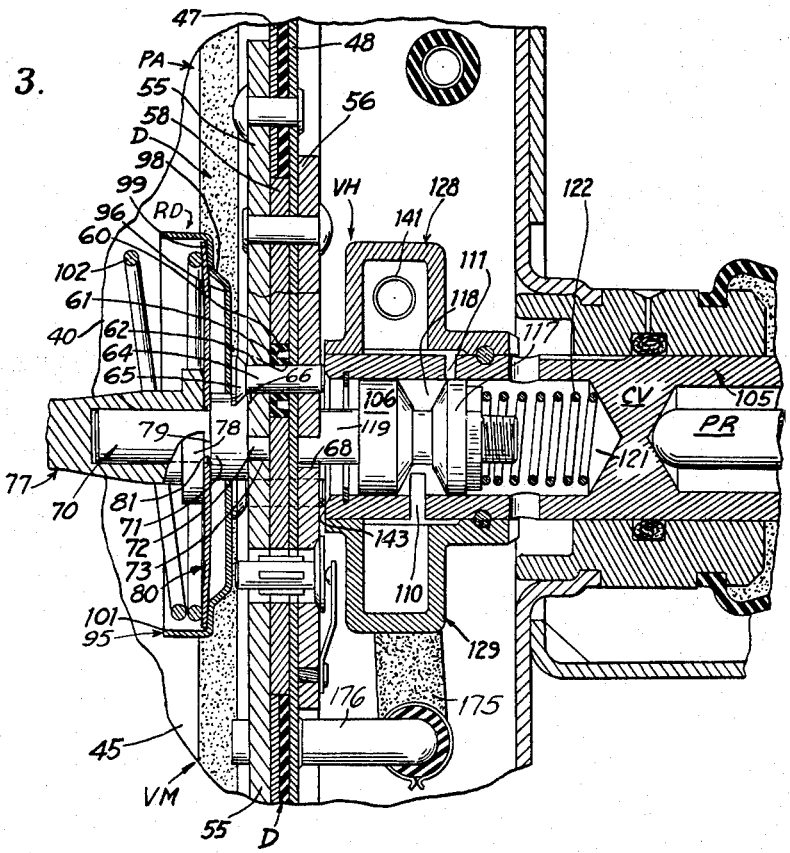
FIGURE 3 is a view similar to FIGURE 2 but showing the reactive mechanism operated to effective position to transmit reaction from the work element, prior to operative energization of the motor in response to initial operator force.

Pressure on the pedal 35 moves the valve housing VH comprising segments 128, 129, and valve sleeve 105 as a unit relatively to the valve piston 106, and since the spring seat member 95 is connected by pins 64 to the valve sleeve, the pins and seat member also move as a unit with the valve sleeve relatively to the power member PA. Initial operator-actuation of the spring seat member 95 tilts (displaces) the peripheral portion of the reaction disc 80 out of plane with respect to the central portion of said disc and thereby deforms the disc into a "dished" or cup-like configuration as shown in FIGURE 3 wherein the disc is placed under tension, it being recalled that the normal status of the disc as shown in FIGURE 1 is devoid of tension (relaxed). During this deforming movement of the disc under influence of initial operator-actuation, the lever-action of the central portion of the disc between the fulcrum area 78 on the plunger 77 and the pressure area on the shoulder 71 separates the end of the plunger 77 adjacent the shoulder 71 and thereby disengages the extension end 74 and bottom 75 of the blind axial bore 76 as shown in FIGURE 3. Substantially coincidental with this separating movement, the plunger 77 is moved minutely forwardly to act on the master cylinder piston 20 to close the compensating port 27 between the fluid reservoir and pressure cylinder 24 which conditions the master working chamber MC to pressurize the brake fluid to operate the vehicle brakes, and the power member PA is forced rearwardly minutely in unison with the valve piston 106 as the valve sleeve 105 advances relatively to said power member and connected valve piston to thereby dispose the valve land 117 over the control-slot 111 to isolate the valve air chamber 121 from the valve vacuum chamber 118 and connect the latter to the control-slot 111 and therefore to the power chamber 45 via elbow 176, conduit 175, tube 151 and cavity 135 in valve segment 128, to operatively energize the power member PA in response to increasing pressure by the operator on the pedal 35. At the point of "cracking" the control-slot 111 to the vacuum chamber 118, initial operator-actuation via the pedal 35, valve sleeve 105, reaction disc 80 and plunger 77, has sufficiently pressurized the brake fluid in the master cylinder chamber 24 and brake lines (not shown) to take up the slack in the hydraulic brake system in readiness for power assistance to cooperate with operator effort to produce jointly the desired braking force according to the conditions in which the vehicle is operating. Accordingly, as the vacuum-motor VM becomes initially energized the pressure area on the shoulder 71 acts on the inner periphery of the reaction disc 80 tending to force the outer periphery rearwardly in opposition to pedal-actuation thereof in accordance with the leverage ratio defined by the intermediate position of the fulcrum area 78 on the plunger 77 about which the disc is pivoting due to the substantially stationary condition of the plunger 77 induced by the non-compressible characteristic of the column of pressurized brake fluid as is understood.

Initial depression of the pedal 35 to the first dashed line position in FIGURE 1 demonstrates the conditioned status of the master cylinder MC and the tilted position of the outer periphery of the reaction disc 80 as shown in FIGURE 3 requisite to place the disc in condition to transmit reaction from the master cylinder to the pedal 35 and to the power assembly PA. This initial movement of the parts as a unit is effected by operator force on the pedal 35 acting through the preloaded thrust-transmitting capacity of the valve return spring 122 and resistance of the reaction disc 80 against deformation (dishing) to place it under tension. The heavier spring 122 is, the more cooperative it will be to operating the master cylinder piston 20 to take up the slack in the brake system, and the lighter this spring is installed, the reaction disc 80 will have to be made stiffer to effect the aforesaid unison movement of the parts as a preliminary conditioning operation of the master cylinder MC operating to pressurize the fluid therein to brake the vehicle. In any case, however, spring 122 must be installed under sufficient tension to overcome the reaction from spring 25 otherwise the aforesaid initial movement of parts as a unit cannot be accomplished under influence of the pedal 35 operated from normally released position wherein the vehicle's brakes are "off," the main control valve CV is closed on its vacuum side and open on its air side with the auxiliary air valve AV open to augment air flow into the vacuum-power chamber 45 for rapid release of the vehicle brakes, and the reaction disc is in normally relaxed condition as shown in FIGURE 1.

As the power member PA, control valve CV and fluid-displacing unit initially move leftward as a unit to close the compensating port 27 under influence of initial operator-actuation transmitted through the preloaded valve spring 122 opposed by spring 25 and supplemented by resistance of the disc 80 to "cup" as defined by the first dashed line position of the pedal in FIGURE 1, operator force on the pedal pressurizes the fluid in the master cylinder MC at substantially the same pressure as the preloaded tension of said valve spring which operation subjects the work element to the aforesaid predetermined resistance (work load) to movement thereof requisite to induce relative operation of the control valve elements 105, 106 to condition the reaction disc 80 to transmit reaction upon operative energization of the booster motor VM in cooperation with pedal-actuation to overcome said resistance and thereby more firmly apply the vehicle brakes as required; whereupon, additional pressure on the pedal arm 35 acts to first cause the valve spring 122 to yield and the reaction disc 80 to dish into somewhat cupped configuration simulating the configuration of the "Belleville" spring washer as shown in FIGURE 3 and thereby place the disc under tension as a function of relative displacement of the valve sleeve 105 and spring seat member 95 as a unit with respect to the power member PA and connected valve piston 106. As the reaction disc cups, the space 79 normally obtaining between the shoulders 71, 78 widens, and the control-slot 111 becomes exposed to the valve chamber 118 thereby connecting the source of vacuum production to the power chamber 45 via the conduit 175 to evacuate air from said chamber to set up differential pressures on opposite sides of said power member to move the same leftward and thereby operatively energize the vacuum-motor VM. It is thus seen that the preloaded status of spring 122 initially moves all of the parts as a unit including the master cylinder piston 20 until the work-performing element 77 reaches a substantially stationary condition against the column of pressurized brake fluid therefore the aforesaid predetermined resistance; whereupon, continued increase in pressure on the pedal arm 35 applies a lever-action on the disc and thereby tensions the same to transmit reaction from the master cylinder MC upon the aforesaid extension 74 becoming slightly disengaged from the bottom 75 of the axial bore 76 in the inner end portion of the work element. This reaction transmission by the reaction disc 80 becomes substantially constant when the aforesaid extension 74 becomes engaged with the bottom 75 of the axial bore 76 to produce a "straight-through" operation of the work element 77 either by the power member PA in part or in cooperation with operator effort on the pedal assembly P. It being noted here that the operator may at all times operate the work element 77 "straight-through" should the booster motor VM prove inadequate or fail completely in the performance of its function.

The flexible characteristics of the reaction disc 80 enables the end of the extension 74 to re-engage the closed end 75 of the blind axial bore 76 following power-run-out of the vacuum-motor VM for "straight-through" operation of the work-performing element 77 jointly or separately by the power member PA and pedal assembly P, and, as previously explained and illustrated in FIGURE 1, this same condition obtains in the normally released status of the booster mechanism BM with the reaction disc 80 in normally flat relaxed disposition.

Upon the control-slot 111 in the valve sleeve 105 being exposed to the vacuum chamber 118, increasing exposure can be effected until the full operating movement of the valve sleeve and piston 105, 106 respectively is fully taken up, at which point, any additional braking pressure needed would be effected by the operator applying pressure through the pedal assembly P via the engaged portions 74, 75 on the extension and plunger respectively to exert more force on the master cylinder piston 20 than the power member PA can apply in cooperation with operator-actuation of the pedal.

Spring 102 is adapted to continuously bias the spring seat member 95 into engagement with the actuating pins 64 and therefore the valve sleeve 105 so that these components move as a unit in both directions under influence of pedal depression and release respectively. Therefore, spring 102 serves to supplement the reaction transmission to the pedal by the reaction disc 80. However, this spring may be eliminated from the reaction structure RD without impairing operativeness of the latter, but the actuating pins would have to interconnect the valve sleeve with the spring seat member to insure unitary movement thereof in both directions of reciprocable movement. Another function assigned to the spring 102 is to maintain the peripheral portion of the reaction disc 80 in engagement with the annular shoulder 99 on the spring seat member 95 so that no lost-motion will be introduced at any time between the disc portion and shoulder thus insuring that these two parts will move the same distance in both directions as the disc is tensioned and relaxed.

Accordingly, at the point of relative movement of the control valve sleeve and piston where the control-slot 111 is "cracked" placing the vacuum source in communication with the power chamber 45, the inner marginal portion of the confronting abnormally spaced faces on the shoulders 71, 78, and the peripheral marginal portion of the disc are disposed out of plane. Thus, it may be said that the reaction disc 80 is now conditioned to transmit reaction from the master cylinder MC to the pedal mechanism P. As the output of booster motor VM increases it is transmitted progressively through the resilient lever-action of said disc with said plunger shoulder 78 acting as the fulcrum. This progressive reaction transferal from the master cylinder continues until the shoulders 71, 78 are forced into normally spaced relationship wherein the full inner marginal portion of the disc therebetween assumes substantially parallel relation with respect to said shoulder, and the stem extension 74 abuts the bottom 75 of the plunger bore 76. At this stage of power output, it may be said that a state of power-run-out has been reached, that is, the motor VM is providing maximum output which if insufficient to bring about the braking force desired, the operator may increase his effort on the pedal arm 35 to make up such deficiency whereby the working end 143 of the control valve CV abuts the thrust plate 56 to enable a "straight-through" application of joint force from the booster motor and operator on the hydraulic piston 20. In this manner, the operator can instantly and automatically cooperate with the maximum energized status of the motor to apply the brakes directly at any time. Thus, the operator may team up with the motor at any time automatically by merely pressing through on the pedal assembly P to bring about maximum stopping effort, and particularly stops in the emergency-panic category which the motor alone may not be powered to handle. It will be noted on referring to FIGURE 3 that when such "straight-through" operation is in effect that the reaction disc 80 has been deformed into maximum "cupped" condition which becomes effective slightly forwardly of the position shown in FIGURE 3, whereby reaction from the master cylinder MC is transmitted by the disc at substantially a constant factor to the brake pedal arm 35 with the space 79 restored to normal width as shown in FIGURES 1 and 2 wherein the extension 74 of the pilot stem 70 abuts the bottom 75 of the plunger bore 76. It should be importantly noted that this novel disc reaction principle is a continuous force-transmitting means, that is to say, the disc does not divert and/or absorb any of the motor and operator operating forces, but to the contrary, all of such forces are transmitted undiminished to actuate the hydraulic piston 20 to effect operation of the vehicle brakes.

The combined tensioning and lever-action characteristics of the disc 80 produce an extraordinary advance in the art to apprise the operator with a measure of the braking pressure effective at a given position of the pedal assembly P, and while this reactive force from the pressurized status of the brake fluid is not impressed proportionally on the power- and operator-operated members PA and P respectively, it does serve in a new and improved manner to smoothly merge pedal- and power-actuated forces and enables the operator to have control over such power forces through the full operating range thereof. Thus, the novel reaction device RD aforesaid provides the operator with a measure of the braking force in effect simulating the more expensive and complicated types of power-brakes which utilize a coaxial hydraulic piston, or a reaction lever system which becomes effective following booster motor energization with resultant erratic effect which prevents predictable control on the part of the operator to smoothly apply the vehicle brakes particularly at low vehicular speeds.

The novel interaction of the reaction device RD with the power member and control valve therefor of various commercial types of booster motors, produces a patentable arrangement, and features of construction and operation of the cooperating elements of these components and more efficient cooperation of such elements during the initial energizing phase of the booster motor by dishing the disc 80 into a configuration similar to a "Belleville" spring washer and wherein said disc may be modified to facilitate dishing of the same and thereby change its resilient characteristic by incorporating radial perforations defining inwardly projecting fingers.

*Rigid-lever reaction system and operation thereof (FIGURES 6, 7 and 8)*

Figure 8:
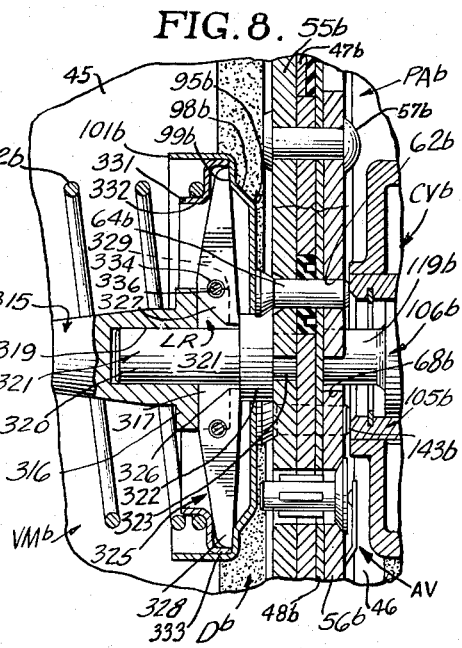
FIGURE 8 is a view similar to FIGURE 6 but showing the reactive levers positioned by initial operator force to transmit reactive forces from the work element upon operative energization of the motor.

This modified mechanical reaction mechanism generally designated "LR" may be substituted for the resilient reaction disc 80, and wherein parts analogous to those already described are designated by like reference characters distinguished, however, by the suffix "b." This lever reaction structure comprises: a modified work-performing element or plunger 315 with its terminal end adjacent the power member PA$^b$ formed as a circular flange or hub 316, preferably having two pairs of diametrically opposed radial-slots 317 positioned at right angles to each other. The bottoms of these slots provide vertical walls 318, and a coaxial blind bore 319 in the end of the hub intersects the inner ends of said slots to separate said slots into four radially disposed slots best shown in FIGURE 7. This bore receives the pilot end 320 of a short cylindrical extension (stem) 321 having an annular pressure flange 322 medially thereof with the other end 323 of the stem fixed as by swedging in a central bore 324 in the thrust plate 55$b$ whereby the stem 321 and plate move as a unit. Each radial slot receives a reaction lever or arm 325 radially disposed with respect to the axis of the vacuum-motor VM$^b$. These levers are normally fulcrumed at 326 against the vertical walls 318 with their inner ends 327 on the opposite side of the fulcrum point adapted to be acted on by the pressure flange 322, and their outer ends 328 on the same side as the pressure point 322 being engageable by confronting portions respectively, the offset shoulder 99b on the movable spring seat 95b, the latter being slidably disposed on the flange 322. Accordingly, the inner end portions of the levers 325 are operatively disposed between the plunger 315 and plate 55b corresponding to the operating disposition of the aforesaid reaction discs, said levers, however, being devoid of resiliency. End faces 329 of radial segments 330 between the aforesaid radial-slots (see FIGURE 7) are normally contiguous to the confronting face of the flange 322 prior to the levers 325 being positioned as shown in FIGURE 8 to transmit reaction from the work load (master cylinder MC). A ring-type spring seat member 331 having oppositely disposed annular concentric flanges 332, 333, is carried forwardly of the outer ends of the levers 325 on the cylindrical out-turned wall 101b of the movable spring seat 95b for receiving reaction from spring 102b as previously explained in connection with the first embodiment (FIGURES 1–4). Each of the levers 325 is provided with a cross bore 334 substantially in the same plane as the fulcrum points 326. Arcuate external grooves 335 are provided in the segments 330 in circular alignment with each other, and a split retainer ring 336 having a smaller cross sectional diameter than the cross bores 334 through the levers, is inserted through said cross bores into engagement with the grooves 335 aforesaid to act as a safety retaining means for the levers in their respective radial-slots 317, and particulraly as a means to retain the levers in the slots during assembly of the motor VMb. Thus ring 336 is detachably incorporated in the mechanism to retain the levers in their operating positions within the slots 317 without interfering with the movement of said levers on their fulcrum points 336.

Figure 6:
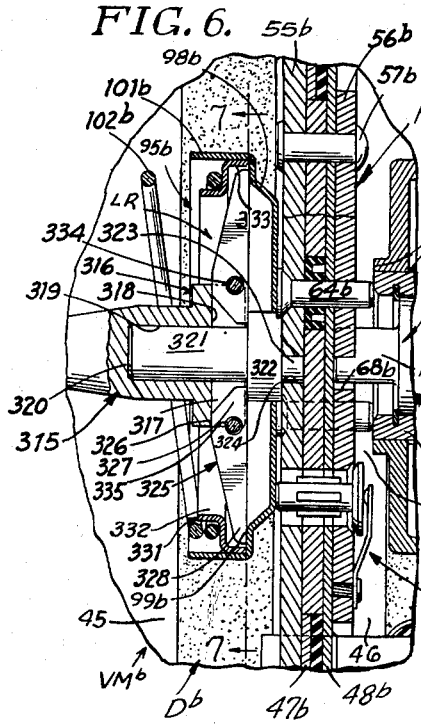
FIGURE 6 is a modified form of the invention in which rigid levers are employed, said levers being in normal ineffective positions to transfer reaction from the work element.
Figure 7:
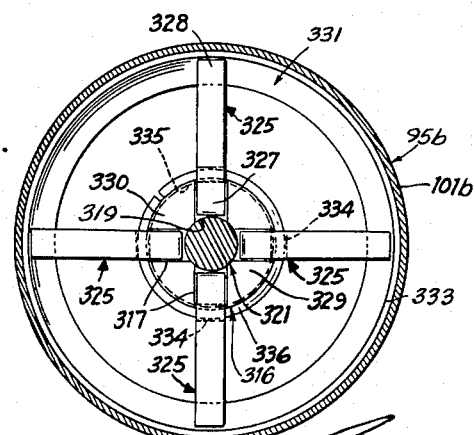
FIGURE 7 is a vertical sectional view taken along the line 7—7 of FIGURE 6 showing the lever arrangement.

Further considering the normal disposition of the reaction levers 325 as shown in FIGURE 6 wherein they are incapable of transmitting reaction from the work element 315, it should be noted that the face portion defining the end of the pressure flange 322, said confronting portions on the offset shoulder 99b and the face portions on said levers defining the inner and outer ends thereof which are normally disposed in contiguous parallelism with respect to their respective face portions on said flange and offset shoulder, negate lever-action therebetween because the end faces 329 on the segments 330 are contiguous to the aforesaid face portion on the pressure flange 322. Separation of the aforesaid faces 329 and flange 322 is requisite to enable the work element 315 to have a "floating" rockable connection with the work element 315, shoulder and flange aforesaid. This conditioning of the levers 325 to transmit reaction from the work element 315 is effected by "tilting" the levers to the position of FIGURE 8 by moving their outer ends under initial personal-actuation of the control valve sleeve 105 prior to operative energization of the booster motor VM. Such conditioning operation being effective to dispose the levers at an angle to the face portions on the offset shoulder and flange 322 for establishing pressure lines as distinguished from the aforesaid normal contiguous parallelism of said cooperating face portions, so that the levers can rock under reaction from the work element 315 thus dividing the total input braking effort between the driver and booster motor according to the leverage-ratio effective on said work element.

In operation, this novel lever transmitting reaction system LR is quite similar to the lever-action of the spring disc 80. With the parts normally disposed as shown in FIGURE 6, the booster mechanism BM is fully released (brakes "off") and the segments 330 on the plunger 315 contiguous to the confronting end of flange 322 thereby freeing the levers 325 of pressure. Depression of the pedal arm 35 to the first dashed line position of FIGURE 1 operates the parts to their relative positions shown in FIGURE 8 wherein the levers have been rotated counterclockwise as viewed in this figure on their fulcrum points 326 by pressure applied to their outer ends via the offset shoulder 99b on the spring seat 95b, the latter being moved leftward from normal position under influence of the pedal as a unit with the pins 64b and the control valve sleeve 105b. This movement of the levers actually converts the fulcrum points 326 to a pressure point, and the inner ends of the levers in engagement with the flange 322 from pressure points to fulcrum points if some movement of the plunger 315 occurs whereby the ends of the segments 330 are further separated from the face of the flange 322 prior to the control valve CVb reaching an operating "on" position to control operative energize of the motor VMb. During this relative separation between the plunger 315 and power member PAb which is accommodated by yielding of the valve return spring 122 enabling the valve piston 106b to move relatively toward the valve sleeve 105b as the latter is moved forwardly under influence of the pedal. Since the valve spring 122 is capable in its preloaded status of initially moving the fluid-displacing unit (plunger 315 and hydraulic piston 20) to take up the slack in the system and bring about a predetermined pressurization of the brake fluid prior to inauguration of the power phase to apply the brakes best demonstrated in FIGURE 8, the reaction levers are rotated until the master cylinder MC is conditioned for operation in the manner just stated, but as soon as the brake fluid is sufficiently pressurized to arrest movement of the fluid-displacing unit in the master cylinder, rotational movement of the levers 325 is reversed to clockwise fashion by pressure applied on their inner ends by the pressure flange 322, thus effecting transmission of proportional reaction from the work element 315 to the power member PAb in accordance with the division of work performed by the latter member as defined by the leverage-ratio of the levers. Thus, said levers 325 are conditioned to transmit reactive forces from the master cylinder MC in response to initial operation of the pedal to effect separation in the fluid-displacing unit in the manner previously described upon the latter encountering a predetermined resistance to movement solely under operator-actuation, whereupon, said levers transmit the division of work performed through the pedal by the operator whereby the total braking effort is proportionally divided between the pedal and power member PAb until maximum power output has been reached, and thereafter, if additional braking force is desired, said levers are effective to transmit such additional operator effort exerted through the pedal assembly P upon operating said levers to a position beyond that depicted in FIGURE 8 to take up all of the operating clearance between the working face 143b defining the forward end of the main control valve CVb and the confronting face on the plate 56b of the power member PAb. In this latter manner, the operating force on the master cylinder MC can be augmented to cooperate with the power-run-out status of the booster mechanism BM where greater braking force is required above that which the booster mechanism BMb is capable of producing to assist operator effort. However, so long as the power developed by the booster motor VMb is sufficient to effect the required braking application, with the plunger segments 330 separated from the flange 322, it is clear that the lever reaction system transmits pressure from the fluid-displacing unit to the pedal and motor power member PAb in direct proportion to the leverage-ratio of said reaction levers 325, but under no circumstances can the control valve CVb be effective to control operative energization of the booster motor VMb unless the plunger segments 330 are in spaced relationship with respect to the end face on the flange 322, and, furthermore, this space is never closed during braking assist from the booster motor VMb or when braking force of greater magnitude than the said motor can produce jointly with said pedal-actuation is required as when operating the levers to a position beyond that shown in FIGURE 8, to fully take up the operating clearance between the cooperating abutment-engaging face portions aforesaid on the control valve CV$^b$ and power-diaphragm plate 56$b$ wherein the valve control-slot 111 is wide open corresponding to power-run-out of the booster motor VM$^b$, the levers are fully tilted forwardly from their non-transmitting position normal to the axis of the power member PA$^b$ thus effecting maximum separation between the fluid-displacing unit and power member, and such additional operator effort can now be transmitted to the work element 315 through said levers in cooperation with maximum power output of the motor VM$^b$. In the event of power failure, operator force transmitted through the reaction levers 325 in fully tilted position, is effective to operate the master cylinder MC to apply and release the vehicle brakes in conventional fashion. Thus, it is seen that when power-run-out occurs, the division of work normally effective through the reaction levers between the operator and the booster motor VM$^b$ can be augmented by additional operator force exerted on the levers 325 in fully tilted position, to produce the desired braking effect, and should power failure occur, operator force alone can be applied through said levers in fully tilted position to operate the master cylinder MC.

The above described lever reaction system LR is characterized by two principal operational differences from those of the resilient disc 80 and FIGURE 5 modification thereof. One of these differences resides in the reaction levers being devoid of resiliency which prevents a "straight-through" operation of the master cylinder MC as in the first embodiment (FIGURE 1) by engagement of the extension 74 with the bottom 75 of the blind axial bore 76 in the work-performing element 77, such operation of the master cylinder with the levers must necessarily be effected through the levers alone as the rigid nature of the levers in operating position maintains the extension 74 disengaged from the work element 77. The second difference is found in the proportional division of work provided by the levers between the operator and booster motor VM$^b$ due to their rigidity as contrasted with the resilient characteristic of the discs which transmit a progressively increasing reactive force rather than such force being proportionally apportioned between the driver of the vehicle and booster motor VM$^b$.

Spring 102$b$ may be dispensed with in this modification provided spring 122$b$ is sufficiently preloaded to bring about the slack take-up and conditioning operations of the master cylinder MC to pressurize the brake fluid. However, spring 102$b$ may be utilized to provide resistance to such initial pedal depression so that the operator feels increasing resistance on the pedal during the slack take-up phase of pedal depression from its normal position. Since spring 122$b$ is preferably stronger than spring 25, this latter spring could serve the same purpose as spring 102$b$ and therefore, optionally, installations which utilize the residual pressure valve RV incorporated in a passageway branched from the pressure working chamber 24 enable the preloaded status of spring 25 to be set as desired since it no longer serves to control the residual valve RV.

This novel lever-reaction system is unique in that it is self-contained and occupies substantially the same space as the previously disclosed reaction plate 80, and especially where reaction proportional to total braking force is desired, it finds special utility in this type of power-brake control.

From the foregoing operational description of the reaction-lever system LR it should be apparent that progressive control of motor output is provided; that is to say, the reaction levers 325 insure that the force produced by the power diaphragm PA$^b$ of the motor VM$^b$, which force is dependent upon the degree of vacuum to which the power diaphragm is subjected, is proportional to the operator effort applied to the pedal assembly P. As the output effort of the motor power member PA$^b$ is transmitted to the fluid-displacing unit, this force reacts through the levers 325 against the spring seat 95$b$ and therefore, against operator effort applied to the brake-pedal, thus providing the operator with a physical perception of the degree to which his own effort is being power-assisted. The reaction is proportionate to the motor output, being governed by the ratio between the fulcrum points 326 and the pressure points at the extremes of the levers on opposite sides of the fulcrum points as is understood. Since the reaction is proportionate, the relation between the input and output efforts is proportionate also. For example, when the force produced by the power member PA$^b$ exceeds the operator input effort, the plunger 315 is moved forwardly by the inner ends of the levers 325. If the physical input effort is maintained constant at this point, the valve piston 106$b$ and the power diaphragm assembly PA$^b$ will advance sufficiently to effect a "lapped" condition with respect to the working land 117 and control-slot 111 and thereby hold the brakes "on" due to the operator input and the motor output forces substantially balancing the reacting pressures on the brake fluid against the piston 20. If, on the other hand, the input effort of the operator is reduced causing a corresponding retraction of the control valve sleeve 105$b$, the control-slot 111 would be correspondingly exposed to the atmospheric valve chamber 121 to admit air to the power chamber 45 to enable release of the power diaphragm PA$^b$ toward a substantially corresponding "off" position. Thus, the proportion between the physical input effort and the output effort generated by the motor VM$^b$ is maintained to give a progressive or follow-up control of the motor output.

If the physical input effort exceeds the maximum force that can be exerted by the motor power member PA$^b$ through the reaction lever 325, which condition obtains when the power member is subjected to full vacuum, the control valve sleeve 105$b$ can be brought into engagement with the plate 56$b$ corresponding to wide open position of the control-slot 111. Thereafter, any increase in the input by the operator will not produce corresponding increase in motor assistance, and in consequence operator effort will be transmitted through the levers 325 to the plunger 315 to the fluid-displacing unit in the master cylinder MC, thus supplementing the maximum effort produced by the motor. Under these conditions, the space between the inner ends of the plunger segments 330 and the confronting face of the shoulder 322 would be at a maximum corresponding to full movement of the levers from normal positions shown in FIGURE 6 to positions beyond the positions of FIGURE 8 in response to pedal-actuation of the valve sleeve 105$b$ into abutting relationship with the plate 56$b$ forming part of the power diaphragm assembly PA$^b$.

The interchangeable designs of the two reaction disc installations, either of which may be substituted for the other, and the reaction-lever system LR which may be employed in lieu of either of the disc installations, as pointed out above, bear a definite relationship to the functional characteristics of the valve return spring 122, to effect transferal of reactive forces from the master cylinder MC to the pedal. This relationship may be summarized as follows:

After the compensating port 27 has been closed in the manner previously described, increased effort on the pedal 35 projects the hydraulic piston 20 farther into the pressure chamber 24 still accompanied by the movable power assembly PA and control valve CV moving as a unit simultaneously with the piston 20 to build-up initial pressure on the brake fluid corresponding substantially to the preloaded status of spring 122 until such pressure reacts on the head of the piston 20 tending to retard movement thereof, that is, said piston encounters a predetermined work load (resistance) to movement; whereupon, valve sleeve 105 is induced relatively to the valve piston 106, such movement being accommodated by the yielding of the spring 122. This relative movement of the valve sleeve which is toward the diaphragm plate 56, correspondingly reduces the operating clearance between the working face 143 of the control valve CV with respect to said plate best demonstrated in FIGURE 3, it being recalled that the forward extension 119 on the valve piston 106 projects through the opening 68 into abutting relation with the plate 48 for unison movement of the valve piston and power-diaphragm PA under influence of the spring 122. As such relative movement of the valve sleeve continues against spring 122 influenced by operator effort on the pedal arm 35, the peripheral marginal portion of the reaction disc 80 is deflected forwardly out of plane with respect to the central marginal portion thereof disposed between the shoulders 71, 78 to tension the disc, or in the case of the reaction-levers 325 they would be rotated counter-clockwise to the position shown in FIGURE 8, prior to or merging substantially with the working land 177 connecting the valve chamber 118 to the power chamber 45 to energize the power member PA as is understood. When such relative movement has progressed sufficiently as demonstrated in FIGURE 3 (disc-action) or FIGURE 8 (lever-action), reactive forces from the work-performing element 77 are transmitted thereby from the shoulder 78 to the offset shoulder 99 on the spring seat member 75, pins 64, valve sleeve, push-rod PR thence through the pedal linkage to the pedal arm 35 itself to provide the operator with physical perception of the amount of braking force in effect in accordance with the booster motor output. This reactive forces is characterized by progressively increasing resistance to pedal movement defined by the tension in the disc 80 and its leverage-ratio if operated in this manner, or in the case of the lever-reaction system LR such reaction force would be proportional to the total pressure effective on the master cylinder piston 20. Accordingly, the discs shown in FIGURES 4 and 5 perform the same function as the plurality of levers 325 shown in FIGURE 6, but due to the resilient action of the discs, proportional transferal of reaction from the master cylinder MC is eliminated.

It is important to also note that during the tensioning "dishing" of the disc 80 or rotation of the levers 325, which is preferably accomplished in part prior to the vacuum-servo VM becoming energized for smooth mergence of the power phase with the operator initiatory phase, the disc 80 or the levers 325 in conjunction with the spring 122 despite the latter yielding and therefore increasing its tension above normally preloaded status, transmit force from the pedal assembly P to additionally pressurize the brake fluid to take up the shoe-to-drum clearance and thus initiate braking action sufficient to cause slight vehicular deceleration to occur before either of the above reaction means become effective to transmit the output of said booster motor VM to the master cylinder MC. However, if spring 122 is lightly preloaded, as for example, at 10 to 15#, then this spring is provided with less capacity to tranmsit thrust before yielding and as a consequence, the booster phase becomes effective in response to less initial pedal travel as is understood. As soon as the pressure on the brake fluid reaches a factor substantially corresponding to the thrust-transmitting capacity of the normal spring-load on the valve sleeve 105, movement of the fluid-displacing unit (hydraulic piston 20) becomes substantially stationary due to the non-compressible column of brake fluid, and, not until this latter condition obtains can the control valve CV be operated relatively as aforesaid to condition the reaction device RD or lever system RL to transmit reaction forces from the master clyinder since it is this arrested state of the piston 20 that provides the fulcrum status on the plunger 77 effective for the disc or levers to function as means to transmit reactive forces.

Although I have illustrated and described three embodiments of my invention, and which are well calculated to fulfill the objects above stated, it will be understood that I do not wish such to be limited to the exact construction and/or arrangement of parts shown, since it is evident that modifications, variations and substitutions may be made therein without departing from the proper scope or fair meaning of the subjoined claims.

Having thus described my invention, I claim:

1. In reaction-transmitting mechanism adapted for use in cooperation with a work-performing element to transmit reaction therefrom to a power member operative to exert the major portion of pressure on said element, and to a personally-actuatable member effective to control operation of said power member and simultaneously contribute the balance of pressure on said element, the improvement which comprises: a movable member; a pressure area on the power member; another pressure area on said movable member radially spaced from said first-named pressure area; a fulcrum area provided on said work element intermediate said two pressure areas in offset relationship thereto; a pair of interfitting portions carried by said work element and said power member respectively to provide limited relative movement therebetween from a normally abutting relationship; means having radially spaced surface portions on one side contiguous to said two pressure areas respectively, and an intermediate surface portion on the opposite side engageable by said fulcrum area when said interfitting portions are in abutting relationship wherein said means is ineffective to transmit reaction; an operative connection between said personal and movable members to provide unitary movement thereof relative to said power member thereby rendering said means effective to transmit reaction by separating said interfitting portions upon said work element encountering a predetermined resistance to movement under personal-actuation to enable said means to transmit progressively augmented reaction from said work element to said power and personal members under joint influence of the latter two members upon operative energization of said power member to exert additional pressure on said work element sufficient to overcome said predetermined resistance in cooperation with the pressure exerted by said personal member.

2. A reaction-transmitting mechanism constructed in accordance with claim 1 in which said means comprise: a circular resilient disc having a central aperture through which the aforesaid interfitting portion of said power member slidably projects to support the same, the radially spaced surface portions defining the inner and outer peripheral margins on said disc on one side thereof, said disc being normally flat and capable of being deformed dish-shaped under tension to transmit reaction from said work element.

3. A reaction-transmitting mechanism constructed in accordance with claim 1 in which said means comprise: a plurality of radially disposed rigid levers arranged in circular configuration about said interfitting portion on said power member, the inner ends of said levers being positioned between said pressure area on said power member and said fulcrum area on said work element normal to the axis of said power member wherein said levers are ineffective to transmit reaction from said work element, said levers being rockable out of normal position in fulcrum engagement with said work element under personal-actuation of the pressure area on said movable member acting on the outer ends of said levers to separate said pair of interfitting portions thereby rendering said levers effective to transmit reaction from said work element.

4. A reaction-transmitting mechanism constructed in accordance with claim 2 in which said resilient disc is formed with a plurality of radially disposed perforations defining a corresponding number of radially disposed resilient levers.

5. A reaction-transmitting mechanism constructed in accordance with claim 4 in which maximum deformation of said resilient disc disposes said personal member in engagement with said power member to operate the same and thereby re-engage said interfitting portions to actuate said work element "straight through" by said personal member independently of said power member.

6. A reaction-transmitting mechanism constructed in accordance with claim 1 in which said interfitting portions comprise: a cylindrical extension projecting coaxially from said power member into a blind axial bore in the confronting end of said work element respectively, the free end of said extension normally engaging the bottom of said blind bore when said means are ineffective to transmit reaction from said work element.

7. In a reaction-transmitting mechanism adapted for use in cooperation with a pressure-applying element to transmit reaction therefrom to a power member operative to exert the major portion of pressure on said element, and to a personally-actuatable member effective to control operation of said power member and simultaneously contribute the balance of pressure on said element, the improvement which comprises: a cylindrical extension projecting coaxially from said power member to move as a unit therewith; an annular enlarged diameter portion spaced from the free end of said extension in juxtaposed relation to said power member to produce an exposed annular face on said portion; a blind axial bore in the end of said pressure-applying element confronting said power member, said bore being adapted to receive a portion of the free end of said extension to slidably support the latter in coaxial relation with respect to said power member; a slidable cup-shaped member defined by a vertical wall terminating in a peripheral cylindrical wall concentric to the axis of said extension; a central aperture through the vertical wall for reception of the enlarged diameter portion on said extension to slidably support the cup-shaped member; a plurality of outer pressure points defining the peripheral margin of said cup-shaped member in radially spaced relation to the axis of said extension; a corresponding number of inner pressure points defining the exposed annular face on said enlarged diameter portion on said extension, in radial alignment with said first-named pressure points; a fulcrum element coaxially associated with the slidably supporting end of said pressure-applying element to move as a unit therewith and having a corresponding number of fulcrum points in radial alignment with and positioned intermediately of said outer and inner pressure points, said fulcrum points being offset from the plane of said outer and inner pressure points; means operatively interconnecting said cup-shaped member with said personal member for movement as a unit; a reaction member contiguously disposed with respect to said outer and inner pressure and fulcrum points when the bottom of the blind bore in said pressure-applying element is abutted by the free end of said extension wherein said reaction member is ineffective to transmit reaction from said pressure-applying element, said cup-shaped member when moved relatively to said power member by said personal member being effective to displace said reaction member from said ineffective position to reaction-transmitting position and simultaneously disengage said extension end from the bottom of said blind axial bore in the pressure-applying element in response to the latter encountering a predetermined resistance to movement under personal-actuation whereby said reaction member is rendered effective to transmit progressively augmented reaction from said pressure-applying element to said power and personal members under joint influence of the latter two members upon operative energization of said power member to exert additional pressure on said pressure-applying element sufficient to overcome said predetermined resistance in cooperation with the pressure exerted by said personal member.

8. A reaction-transmitting mechanism constructed in accordance with claim 7 in which said reaction member is deformable to produce tension therein.

9. A reaction-transmitting mechanism constructed in accordance with claim 8 in which said bottom of said axial bore in said pressure-applying element is re-engageable with the free end of said cylindrical extension slidably projecting into said axial bore upon maximum deformation of said reaction member whereby a "straight through" connection is provided between said personal member and said pressure-applying element.

10. A reaction-transmitting mechanism constructed in accordance with claim 7 in which said reaction member is characterized by rigidity.

11. In reaction-transmitting mechanism adapted for use in cooperation with a movable thrust element to transmit reaction therefrom when acted on jointly by a pair of cooperating actuatable members, with one of said members being effective to control the other member, the improvement which comprises: a movable member; a pressure area operatively associated with one of said actuatable members; another pressure area operatively associated with the other actuatable member in radially spaced relation to the first-named pressure area; a fulcrum area provided on said thrust element intermediate said two pressure areas and offset from the latter areas; a plurality of reaction levers arranged in circular configuration and contiguously disposed with respect to the said two pressure areas on one side and the fulcrum area on the other side thereof when a portion on said thrust element is normally contiguous to a portion on the other actuatable member wherein said reaction levers are ineffective to transmit reaction from said thrust element; and an operative connection between said movable member and said one actuatable member to impart unitary movement thereto relative to said other actuatable member whereby said reaction levers are moved on said fulcrum area upon encountering a predetermined resistance to movement of said thrust element, to effect relative displacement between the aforesaid portions in opposite directions to dispose said reaction levers in reaction-transmitting positions, in response to said thrust element being acted on by both actuatable members to overcome said predetermined resistance; and separate means for actuating said actuatable members respectively.

12. In reaction-transmitting mechanism adapted for use in cooperation with a movable work-performing element to transmit reaction therefrom when acted on jointly by a pair of cooperating actuatable members, with one of said members being adapted to control the other member, the improvement which comprises: a pressure-applying area operatively associated with said one actuatable member; another pressure-applying area operatively associated with the other actuatable member and radially spaced from said first-named pressure-applying area; a fulcrum area provided on said work element, said latter area being disposed intermediately of said two pressure-applying areas; a reaction-transmitting member contiguously disposed with respect to the said two pressure-applying areas and said fulcrum area when said work element is fully retracted wherein said reaction member is released to a position ineffective to transmit reaction from said work element; and an operative connection between said pressure-applying area on said one actuatable member and one end of said reaction member effective to move the latter two members as a unit on its fulcrum area to minutely displace said work element relatively with respect to said other actuatable member in opposite directions upon said work element encountering a predetermined resistance to movement, and thereby establish said reaction member in a different position capable of transmitting reaction from said work element to said pair of actuatable members upon said other actuatable member applying sufficient pressure on said work element via the opposite end of said reaction member to overcome said predetermined resistance in cooperation with and under control of said one actuatable member.

13. In reaction-transmitting mechanism adapted for use in cooperation with a movable work-performing element to transmit reaction therefrom to a pair of cooperating actuatable members, with one of said members being adapted to control the other member, the improvement which comprises: a reaction-transmitting member rockable on a fulcrum provided on said work element from normal position wherein said reaction member is incapable of transmitting reaction from said work element due to contiguous parallelism of portions on said reaction member, said work element and said one actuatable member, respectively, to an operating position under influence of said one actuatable member actuated relatively to the other actuatable member as a function of said work element encountering a predetermined resistance to movement, and thereby disposing said reaction member in reaction-transmitting position enabling transmission of reaction thereby upon said pair of co-operating actuatable members simultaneously acting on opposite ends, respectively, of said reaction member to overcome said predetermined resistance reacting on said work element.

14. In reaction-transmitting mechanism adapted for use in cooperation with a movable work-performing element to transmit reaction therefrom when acted upon jointly by a pair of cooperating actuatable units, with one of said units being adapted to control the other unit, the improvement which comprises: a reaction-transmitting member rockable on a fulcrum provided on said work element, from normal position wherein said reaction member is incapable of transmitting reaction to said work element, to a plurality of operating positions whereat said reaction member is capable of transmitting reaction from said work element in response to said pair of actuatable units simultaneously acting on opposite ends respectively of said reaction member; and a pair of operative connections between said opposite ends respectively of said reaction member and units respectively on said actuatable units to enable said reaction member to be rocked from normal position under influence of the one actuatable unit actuated relatively to the other actuatable unit to effect minute relative displacement of the work element with respect to the other actuatable unit in opposite directions upon said work element encountering a predetermined resistance to movement, and thereby sequentially establish said operating positions of the reaction member to transmit reaction from said work element in accordance with the actuating status of the other actuatable unit in cooperation with and under control of the one actuatable unit.

15. In reaction-transmitting mechanism adapted for use in cooperation with a movable work-performing element to transmit reaction therefrom when acted on jointly by a pair of cooperating actuatable members, with one of said members being adapted to control the other member, the improvement which comprises: a pressure-applying area operatively associated with said one actuatable member; another pressure-applying area operatively associated with said other actuatable member and radially spaced from the first-named pressure-applying area; a fulcrum area provided on said work element intermediate said two pressure-applying areas in offset relation to the latter areas; a reaction-transmitting member characterized by resiliency and contiguously disposed on one side with respect to the said two pressure-applying areas and the opposite side with respect to said fulcrum area when said work element is fully retracted normally into abutting relationship with said other actuatable member wherein said reaction member is relaxed thus ineffective to transmit reaction from said work element; and an operative connection defined by the pressure-applying area on said one actuatable member and one end of said reaction member to operatively deform the latter member thereby inducing tension therein, and to simultaneously displace said work element relatively to the other actuatable member in opposite directions out of abutting relationship upon initial operator-actuation of said one actuatable member relatively to the other actuatable member upon subjecting said work element to a predetermined resistance to condition said reaction member to transmit reaction from said work element to said actuatable members in response to sequential actuation of said other actuatable member in cooperation with and under control of said one actuatable member to overcome said predetermined resistance by joint application of pressure on said work element by said two actuatable members, with the other actuatable member acting on the opposite end of said reaction member.

16. In reaction-transmitting mechanism adapted for use in cooperation with a movable work-performing element to transmit reaction therefrom when acted on jointly by a pair of cooperating actuatable members, with one of said members being adapted to control the other member, the improvement which comprises: a pressure point on said one actuatable member; another pressure point on the other actuatable member and which is radially spaced in relation to the first-named pressure point; a portion operatively associated with said work element to provide a fulcrum point intermediate said two pressure points in offset relation to the latter points; a normally relaxed circular reaction disc formed with a plurality of inwardly projecting radial fingers interconnected at their outer peripheral portions, said portions being contiguously disposed with respect to the said two pressure points on one side and said fulcrum point on the other side, said disc being incapable of transmitting reaction from said work element when the latter is fully retracted; and operative connections defined by the two pressure points in engagement with the outer and inner end of said fingers respectively whereby initial operator-actuation of the one actuatable member relative to the other actuatable member upon said work element encountering a predetermined resistance to movement, deforms said fingers with consequent tensioning induced therein, and simultaneously displaces said work element relatively to the other actuatable member in opposite directions, in response to such tensioning to condition the reaction disc to transmit reaction from said work element to said actuatable members upon the other actuatable member applying sufficient pressure on said work element via said operative connection therebetween in cooperation with said one actuatable member to overcome said predetermined resistance, under control of said one actuatable member.

17. In a reaction-transmitting mechanism for use in a pressure differential operated motor having a housing in which a pressure-responsive wall is movable under control of valve means characterized by a pair of relatively movable portions in operative follow-up association with said wall, one of said valve portions being personally movable to control the differential pressures acting on said wall, and a work-performing member coaxially-related to said wall, the improvement which comprises: reaction means having first, second, and third points spaced from each other and normally positioned with respect to said wall, work member, and one valve portion, respectively, to render said reaction means ineffective to transmit reaction from said work member, said one valve portion being movable relatively to said wall to dispose said reaction means in a different position relative to said wall, work member, and one valve portion and simultaneously effecting displacement of said work member relative to said wall as a function of said work member encountering a predetermined resistance to movement under initial personal-actuation, and thereby conditioning said reaction means for transmission of reaction from said work member upon operative movement of said wall under pressure differential.

18. In a reaction-transmitting mechanism for use in a pressure differential operated motor having a housing in which a pressure-responsive wall is movable under control of valve means characterized by a plurality of relatively movable portions in operative follow-up association with said wall, one of said valve portions being personally movable to control the differential pressures acting on said wall, and a work-performing member coaxially-related to said wall, the improvement which comprises: force-dividing means movable relatively to said wall, said work member and said valve means and being normally disposed normal to the axis of said work member in engagement with said wall, said work member and said one valve portion wherein said dividing means are incapable of transmitting reaction from said work member due to contiguous parallelism of portions on the latter, said wall and said dividing means, respectively, said one valve portion being personally movable relatively to a different valve portion movable as a unit with said wall to dispose said dividing means out of normal with respect to the axis of said work member and thereby simultaneously effecting displacement of the latter relative to said wall as a function of said work member encountering a predetermined resistance to movement under initial personal-actuation, for conditioning said dividing means to transmit reaction from said work member upon operative movement of said wall under pressure differential.

19. In a reaction-transmitting mechanism for use in a pressure differential operated motor having a housing in which a pressure-responsive wall is movable under control of valve means characterized by a plurality of relatively movable portions in operative follow-up association with said wall, one of said valve portions being personally movable to control the differential pressures acting on said wall, and a work-performing member coaxially-related to said wall, the improvement which comprises: force-dividing means including a plurality of radially disposed levers having their outer ends contiguous to said one valve portion, their intermediate portions contiguous to said work member and their inner ends contiguous to said wall, said levers being normally disposed normal to the axis of said wall wherein said levers are incapable of transmitting reaction from said work member due to contiguous parallelism of portions on the inner ends of said levers, said wall and one valve portion, respectively, said one valve portion being personally movable relatively to a different valve portion movable as a unit with said wall to dispose said levers out of normal with respect to the axis of said work member and thereby simultaneously effecting displacement of the latter relative to said wall as a function of said work member encountering a predetermined resistance to movement under initial personal-actuation, for conditioning said levers to transmit reaction from said work member upon operative movement of said wall under pressure differential.

20. In a reaction-transmitting mechanism for use in a pressure differential operated motor having a housing in which a pressure-responsive wall is movable under control of valve means characterized by a plurality of relatively movable portions in operative follow-up association with said wall, one of said valve portions being personally movable to control the differential pressures acting on said wall, and a work-performing member coaxially-related to said wall, the improvement which comprises: normally relaxed resilient means including a plurality of radially disposed levers deformable to induce tension therein for reaction transmission thereby, said levers having their outer ends contiguous to said one valve portion, their intermediate portions contiguous to said work member and their inner ends contiguous to said wall, and being normally relaxed wherein reaction transmission thereby from said work member is negated due to contiguous parallelism of portions on the inner ends of said levers, said wall, and said work member, respectively, said one valve portion being personally movable relatively to a different valve portion movable as a unit with said wall to deform said levers and thereby simultaneously effecting displacement of said work member relative to said wall as a function of said work member encountering a predetermined resistance to movement under initial personal-actuation, whereby said levers are conditioned under tension to transmit reaction from said work member upon operative movement of said wall under pressure differential.

References Cited by the Examiner
UNITED STATES PATENTS

| 2,828,719 | 4/58 | Ayres | 121—41 |
| 2,832,316 | 4/58 | Ingres | 121—41 |
| 2,900,963 | 8/59 | Ayres | 121—41 |
| 3,002,499 | 10/61 | Schultz | 91—376 |
| 3,013,533 | 12/61 | Brown | 91—376 X |
| 3,013,535 | 12/61 | Schultz | 91—376 |
| 3,013,537 | 12/61 | Schultz | 91—376 |

FRED E. ENGELTHALER, *Primary Examiner.*

KARL J. ALBRECHT, SAMUEL LEVINE, *Examiners.*